United States Patent Office 3,069,820
Patented Dec. 25, 1962

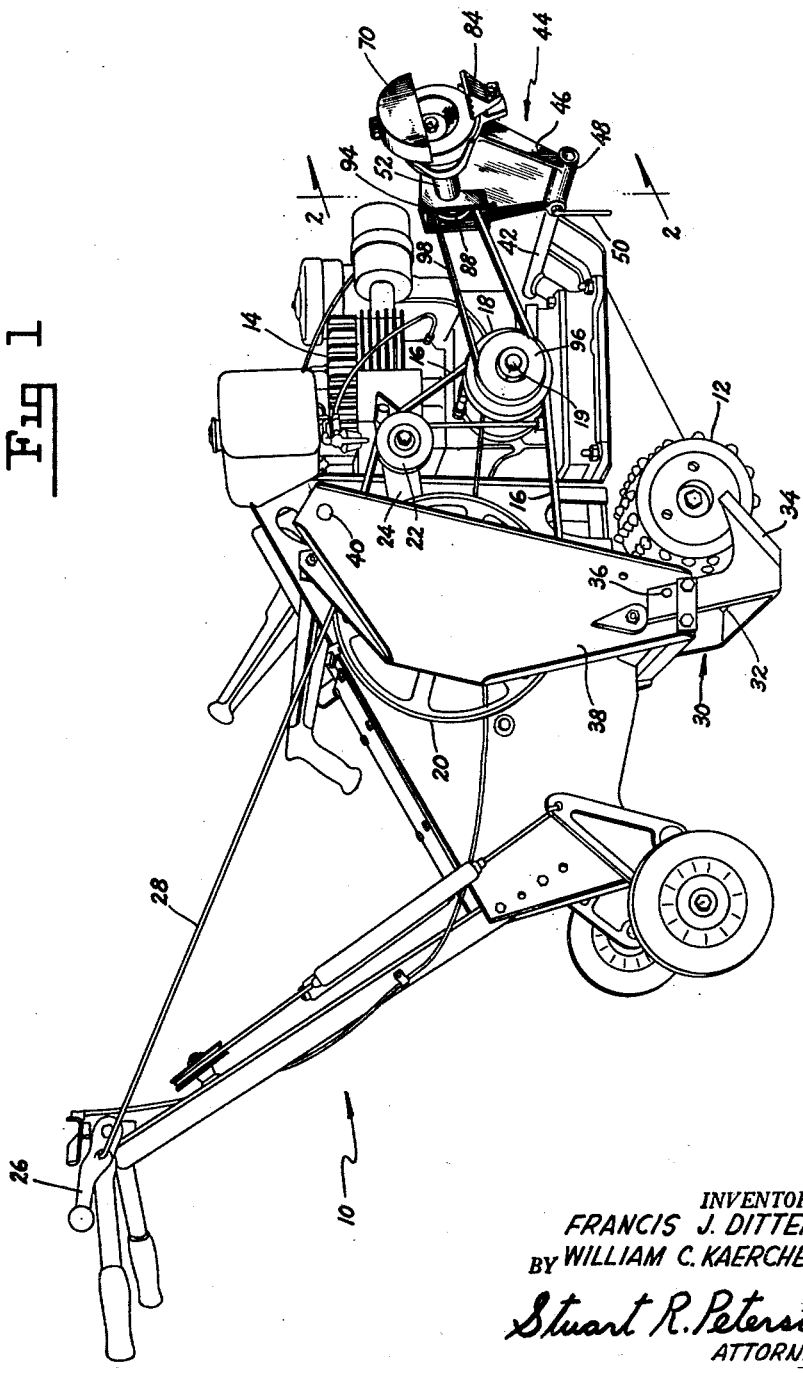

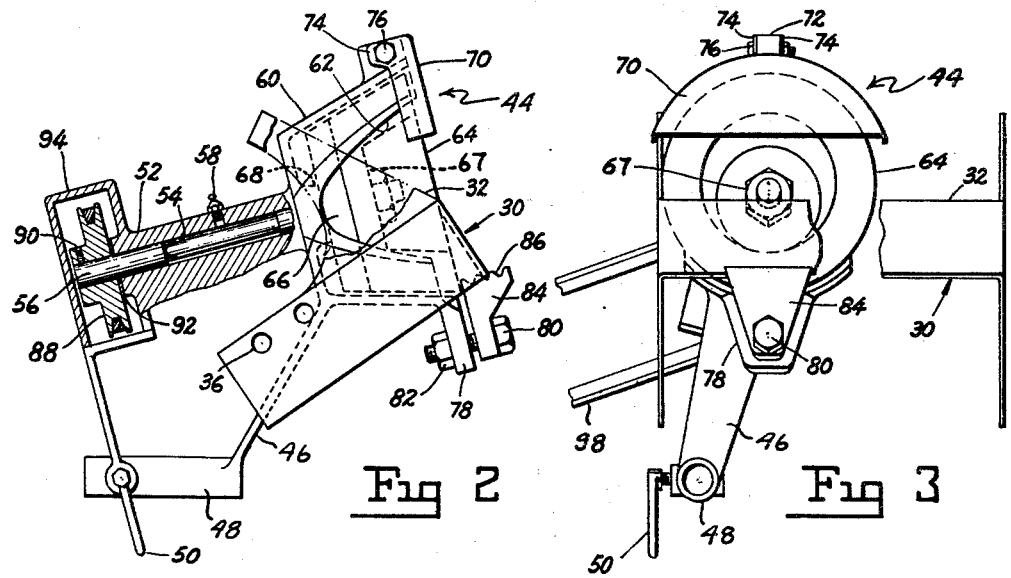

3,069,820
GRINDING ATTACHMENT FOR SOD
CUTTING MACHINE
Francis J. Ditter and William C. Kaercher, Jr., Minneapolis, Minn., assignors to Federal Aircraft Works, Inc., Minneapolis, Minn., a corporation of Minnesota
Filed Oct. 26, 1959, Ser. No. 848,795
4 Claims. (Cl. 51—247)

This invention relates generally to apparatus for sharpening the blades of self-propelled sod cutting machines, and pertains more particularly to a grinding attachment that can be readily mounted on a sod cutting machine so as to be powered thereby during the blade sharpening procedure.

Engine-driven sod cutting machines employing an oscillating U-shaped blade for severing a strip of sod from a field of turf have been rather widely adopted. The cutting blade of course requires sharpening at various intervals, the frequency of which will depend largely upon the specific soil conditions that are encountered.

Various sharpening techniques have heretofore been resorted to. For instance, the sod cutting machine may be tipped on its side so that the cutting edges of the blade may be hand filed. To do a good job, however, is time consuming, and if the blade has been chipped it is virtually impossible to recondition properly the blade in the field.

Obviously, transporting a blade to a shop just to sharpen it is practically out of the question because of the time that is involved. Consequently, large-scale operators usually maintain a number of sharpened blades on hand and will replace a blade when it becomes dull. Blades, however, are relatively expensive, and a considerable investment is therefore required if any sizable inventory is to be maintained.

Accordingly, a very real need exists for apparatus capable of quickly sharpening a sod cutting blade in the field where the sod cutting machine is being used. More particularly it is a desideratum to accomplish the sharpening job right at the machine itself and at any place where the machine happens to be at the time the blade becomes dull. Therefore, one object of the present invention is to provide a grinding attachment for sod cutting machines which will enable the machine's operator to effectively sharpen the cutting blade or knife at anytime it becomes desirable to do so and without the loss of time which would result from taking the blade to a shop or other remote vantage point.

Owing to the particular U-shaped configuration of a sod cutting knife, the invention has for another object the provision of a grinding attachment that will permit the sharpening of all portions of the blade, including the tendril sections at each side and the hard to get at inside corners.

A further object is to provide a grinding attachment of the foregoing character that can be quickly and easily mounted to or detached from the sod cutting machine. Not only does the invention provide for readily attaching a grinder to a sod cutter, but it has for a more specific aim the employment of a quick locking mechanism that locks the unit in the proper position so as to maintain its flexible belt under the proper amount of tension. In this regard, it should be pointed out that the grinding attachment is held in such a manner that its own weight contributes to keeping the proper belt tension. However, the alluded to locking feature is designed to permit facile adjustment, when needed, to compensate for belt wear or stretch.

Yet another object of the invention is to provide a grinder attachment intended for use with a sod cutting machine but which may be used in the shop when desirable or expedient to do so. To accomplish this objective, it is intended that the grinder attachment be mounted on a work bench through the agency of an auxiliary bracket, the belt then being powered by an electric motor or whatever source of power is readily available in the shop.

A further object is to provide a grinder attachment for use with a sod cutting machine having guard means offering protection from the abrasive wheel in accordance with accepted standards, yet allowing the operator to sharpen all of the desired edges and corners of the sod cutter blade. It is also within the contemplation of the invention to provide an adjustable guard that permits removal of the grinding or abrasive wheel without first having to detach the guard structure.

Still further, the invention has for an object the provision of an adjustable tool rest for effecting proper positioning of the blade during sharpening, and also a tool rest that can be adjusted so as to offset the dimensional change of the grinding wheel due to wear.

Still another object is to provide a grinding attachment for sod cutters that will be inexpensive to manufacture, yet rugged and capable of frequent use.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a side perspective view of a typical sod cutting machine equipped with one type of grinder attachment that the invention may assume;

FIGURE 2 is a view of the grinder attachment taken generally in the direction of line 2—2 of FIGURE 1, portions being broken away to depict its internal construction with a sod cutting blade being super-imposed to show one step of the sharpening procedure;

FIGURE 3 is a front elevational view of the attachment appearing in FIGURE 2.

Referring first to FIGURE 1 where a sod cutting machine designated by the numeral 10 is shown in its entirety, it will be observed that the machine there set forth is equipped with a traction roller 12 driven from an internal combustion engine 14 via a belt 16 passing over a driving pulley 18 on the engine shaft 19 and a large driven pulley 20 on another shaft parallel to said shaft 19. A belt tightening pulley 22 is rotatably carried at the free end of a pivotal arm 24 which arm can be actuated by a hand lever 26 and a connecting rod 28. In other words, when the hand lever 26 is pulled in a counterclockwise direction, the pulley is urged against the belt 16 to effect driving engagement between the pulleys 18, 20 and the belt 16. While not visible in the drawings, it will be understood that rotation of the pulley 20 causes rotation of the roller 12, it being contemplated that a suitable chain and sprocket connection be provided between these elements.

The machine 10 also includes a U-shaped sod cutting blade 30 having a horizontal edge at 32 and a pair of forwardly inclined edges at 34 disposed in parallel vertical planes, only one of which edges is visible in FIGURE 1. By means of a pair or more apertures 36 provided at the sides of the U-shaped blade 30, the blade may be clamped to the lower ends of a pair of movable arms 38 pivotally suspended at their upper ends on a support shaft 40.

Oscillatory movement is imparted to the arms 38, and hence to the blade 30 by a pair of eccentric mechanisms, one located at each side of the machine and actuated by the shaft on which the pulley 20 is affixed. Through this arrangement, rotation of the pulley 20 is instrumental in oscillating the blade 30 back and forth, as well as causing advancement of the machine 10 across a field of turf in effecting severance of a sod strip.

Fixedly attached to the forward end of the machine 10 is a bumper bar 42 serving principally as a means for deflecting objects in the path of the machine and also as a support when it is desired to tilt the machine forward for inspection.

No attempt has been made to describe the sod cutting machine 10 in complete detail, although sufficient information is believed to have been presented for an understanding of the instant invention; however, should further details be desired reference may be had to the patent application of Francis J. Ditter, Serial No. 503,-496 for Sod Cutting Machine in which a more detailed discussion is set forth, this application having been allowed on May 8, 1959 and assigned to the same assignee as the instant application.

Use is made of the bar 42 to support the grinding attachment, the embodiment set forth in FIGURES 1–3 having been generally denoted by the reference numeral 44. It will be observed that this attachment 44 includes a casting or webbed frame 46 formed at its lower end with an integral tubular sleeve 48 slidable over the laterally projecting end of the bar 42. Through the agency of a locking handle 50 having a set screw portion, the frame 46 may be detachably secured in a preferred angular position on the bumper 42.

As can be seen from FIGURE 2, the upper end of the frame 46 is formed with a cylindrical portion 52 having an inclined bore 54 extending therethrough. Journaled in the bore 54 is an arbor 56, the central section of which is undercut to provide a lubricant chamber. A fitting 58 allows easy addition of lubricant when needed.

The cylindrical portion merges into an outwardly flaring housing or fixed shield 60 having cut out sections 62 at each side. The housing 60 accommodates a cup-shaped grinding wheel 64 which encircles one end of the arbor 56 and which is clamped thereto by means of a nut 67. As is conventional, the abrasive grinding wheel 64 has cemented thereto a backing plate 66 and this plate 66 conveniently acts as a thrust bearing, confronting an annular boss or collar 68 integral with the housing 60. In other words, when the wheel 64 rotates, said plate bears against the fixed collar 68.

A flap-type guard 70 is pivotally mounted to the upper side of the housing 60. The pivotal mounting is through the medium of an upwardly projecting lug 72 on the housing 60 straddled by a pair of ears 74 formed on the guard and through which a pin 76 passes. This mounting arrangement allows the guard 70 to be swung upwardly away from the face of the grinding wheel 64 when it is necessary to do so. Not only does the guard 70, by reason of its pivotal mounting, allow proper access to the grinding wheel 64 during the entire sharpening procedure, but it enables the operator to remove the grinding wheel from the arbor 56 without having to remove the guard.

The housing 60 is provided with a downwardly extending lug 78 which has a threaded aperture extending therethrough for the reception of a bolt 80. A lock nut 82 permits the bolt to be retained in a preferred axial position. The purpose of the bolt 80 is to support a tool rest 84 also having a threaded aperture through which the bolt passes. The upper side of the tool rest 84 is formed with several transverse grooves or serrations 86 for supporting the U-shaped blade 30 when being sharpened. More will be said later on concerning the manner in which the blade 30 is actually sharpened.

At the opposite end of the arbor 56 from the grinding wheel 64 is a pulley 88 held fast on the arbor by a set screw 90. Intermediate the adjacent end of the cylindrical portion 52, which incidentally is machined smooth, is a thrust washer 92. A somewhat U-shaped housing 94 functions as a guard for the pulley 88.

Mention has already been made concerning the use of a pulley 18 about which the belt 16 is entrained. Also on the engine shaft is a second driving pulley 96. This latter pulley 96 of course rotates in unison with the pulley 18, being on the same shaft 19, but by reason of a belt 98 looped thereabout and about the arbor pulley 88, a driving relationship is provided for the grinding wheel 64. It will be understood that the pulley 96 will ordinarily remain on the shaft 19 with the belt 98 usually remaining on the attachment 44, more specifically having one end thereof looped about the pulley 88; it will be appreciated that the other end of the belt 98 can be quickly passed over the driving pulley 96 as the attachment 44 is mounted on the bumper bar 42.

It might be emphasized at this time that whenever a sharpening operation is to be undertaken the grinding attachment 44 can be quickly mounted on the bumper bar 42 and after having passed the left end of the belt 98 over the pulley 96, the attachment can be tilted toward the right, as viewed in FIGURE 1, to tighten this particular belt 98. Tightening of the locking handle 50 will assure that the belt 98 will be maintained sufficiently tight to produce rotation of the grinding wheel 64. Should belt wear or stretch occur, the attachment 44 would be angularly shifted farther to the right, i.e. in a clockwise direction as seen in FIGURE 1.

Assuming that the attachment 44 has been mounted on the bumper bar 42 in preparation for a blade sharpening operation, the operator then detaches the blade 30 from the arms 38. With the hand lever 26 pushed forward to allow the arm 24 to drop downwardly, thereby loosening the belt 16, there will be no rotation of the roller 12 or oscillation of the arms 38 when the engine 14 is started. In other words, the belt clutch arrangement has effected a disengagement of the engine as far as normal machine operation is concerned.

However, when the engine 14 is started, the pulley 96 will cause rotation of the pulley 88 and thus rotation of the arbor 56 and the cup-shaped grinding wheel 64 carried thereon.

Depending on the slope of the horizontal cutting edge 32 the blade 30 is then placed in one of the grooves 86 on the tool rest 84 with said edge bearing on the face of the grinding wheel 64. It will be noted from FIGURE 2 that by virtue of the sloping bore 54 a convenient tilt is given to the wheel 64, thereby making it easier for the operator to manipulate the blade 30 over the grinding surface provided by the wheel 64 and at the same time to allow him to observe more readily what is taking place. In conducting the grinding operation, the operator will usually kneel or stoop to a position that is convenient and comfortable.

It is important to appreciate that in sliding the blade 30 from side to side on the tool rest 84 that access is had to the corners of the blade. Stated somewhat differently, the full length of the edge 32 will be made to engage the wheel 64. Witness, for example, the grinding contact being made with the extreme left end of the edge 32 appearing in FIGURE 3. When the blade 30 is moved to the left the right hand corner will then assume a similar position at the other side of the wheel 64.

When the edge 32 has been sharpened, the operator may then turn the blade 30 at right angles so that one of the tendril knives will confront the wheel face, thereby enabling one edge 34 to be sharpened. After this, the other tendril edge 34 can be sharpened by turning the blade through 180°. Although this phase of the sharpening operation has not been pictorially set forth, it will be understood that the backside, i.e., the edge opposite the cutting edge 34 will be supported on the tool rest 84. Due to the mounting of this rest member 84 on the bolt 80, it will be appreciated that the blade 30 and the tool rest may be rocked from side to side to sharpen the particular edge then confronting the face of the abrasive wheel 64. In this way the full length of the edge 34, even though shorter than the edge 32, can readily be subjected to the abrasive action of the face of the wheel 64.

If for any reason the guard 70 offers interference with the sharpening procedure, it may be swung upwardly to whatever extent is necessary to permit the sharpening to take place. Of course, the cut out sections 62 in the shield 60 aid in providing the appropriate grinding engagement inasmuch as they permit the entire length of the main edge 32 to be sharpened without interference from the tendril sections.

As the grinding wheel 64 becomes worn, the bolt 80 may be advanced so as to move the tool rest 84 in the direction of the grinding wheel's face. In other words compensation can be made for whatever dimensional change occurs. Also, the tool rest 84 can easily be inverted on the bolt 80 without having to remove same whenever the wheel 64 is to be taken off.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A grinding attachment for sharpening a U-shaped blade employed on a sod cutting machine that is provided with an engine-driven shaft used normally for causing oscillation of said blade when severing a strip of sod, said shaft projecting from one side of the machine and having mounted thereon a grooved drive pulley, the attachment comprising:
   (a) a frame;
   (b) means for mounting said frame to said sod cutting machine;
   (c) an arbor rotatably supported by said frame;
   (d) a cup-shaped grinding wheel affixed to said arbor for rotation therewith;
   (e) a grooved pulley also affixed to said arbor;
   (f) a flexible belt entrained about said last-mentioned pulley and adapted to encircle the pulley on the engine-driven shaft for thereby causing rotation of said arbor and grinding wheel;
   (g) a tool rest;
   (h) means pivotally connecting said tool rest to said frame including a bolt threadedly engaged with said frame so that said tool rest may be moved toward said grinding wheel when sharpening said blade in the field where a sod cutting operation is taking place;
   (i) a guard element, and
   (j) means pivotally attaching said guard element to said frame for swinging movement about an axis transverse to the axis of said arbor.

2. The combination set forth in claim 1 in which said frame includes an outwardly flaring shield having cut out portions at either side and to which said guard element is pivotally attached.

3. A grinding attachment for sharpening a U-shaped blade employed on a sod cutting machine that is provided with an engine-driven shaft used normally for causing oscillation of said blade when severing a strip of sod, said shaft projecting from one side of the machine and having mounted thereon a grooved drive pulley, the attachment comprising:
   (a) a frame including a web member and an integral tubular sleeve means at the lower end thereof adapted to encircle a laterally extending bumper bar on said sod cutting machine for pivotally mounting said frame to said machine and including elongated bearing means at the upper end thereof, said elongated bearing means constituting an integral cylindrical portion having its bore inclined with respect to said tubular sleeve and said arbor passing completely through said bore so as to provide said projecting ends;
   (b) an arbor journaled for rotation in said bearing means and projecting from opposite ends of said bearing means;
   (c) a cup-shaped grinding wheel affixed to one of said projecting arbor ends and having a diameter greater than the thickness of said frame, and
   (d) a grooved pulley affixed to the other projecting arbor end for driven engagement with a flexible belt when said belt is engaged with said driving pulley.

4. A grinding attachment in accordance with claim 3 including:
   (a) a set screw extending radially through a portion of said tubular sleeve.

References Cited in the file of this patent

UNITED STATES PATENTS

| | | |
|---|---|---|
| 753,630 | Rich | Mar. 1, 1904 |
| 939,115 | Ward | Nov. 2, 1909 |
| 1,432,402 | McLeran | Oct. 17, 1922 |
| 2,597,325 | Hodges | May 20, 1952 |
| 2,742,742 | Barrett | Apr. 24, 1956 |
| 2,879,633 | Gage | Mar. 31, 1959 |

FOREIGN PATENTS

| | | |
|---|---|---|
| 105,228 | Sweden | Aug. 11, 1942 |
| 505,091 | Canada | Aug. 17, 1954 |